April 11, 1967          M. ZENKER          3,313,612

MOTION TRANSMITTING MEANS FOR GLASS FEEDER PLUNGER

Filed May 18, 1962          4 Sheets-Sheet 1

INVENTOR
Martin Zenker
By: Kelman and Berman
Agents

United States Patent Office 3,313,612
Patented Apr. 11, 1967

3,313,612
MOTION TRANSMITTING MEANS FOR GLASS FEEDER PLUNGER
Martin Zenker, Hagen, Westphalia, Germany, assignor to H. Putsch & Comp., Hagen, Westphalia, Germany
Filed May 18, 1962, Ser. No. 195,770
7 Claims. (Cl. 65—331)

This invention relates to a glass feeder for ejecting a predetermined quantity of molten glass from a storage container by means of a plunger adapted to move vertically toward and away from an outlet aperture of the container. The movement of this plunger determines the shape and weight of the lump of glass emerging from the outlet aperture. The lump of glass should be drop shaped to facilitate cutting off by shears. After cut-off, the remaining glass should lift rapidly from the shears to avoid excessive load on the latter, and should return into the container through the outlet aperture for re-heating. Thus, it is desirable for the plunger to force the glass out of the aperture abruptly in order to produce a certain thickening of the lump of glass, whereupon the plunger should be lifted at high speed initially in order to produce an appropriate constriction at the cut. The plunger should then be lifted further, at a slow speed, in order to ensure gradual discharge of the glass, since the next mold is generally not available for filling with a new lump of glass until after a certain time has elapsed. After reaching its top position, the plunger should descend at constant speed in order to eject a new lump of glass, and the downward movement can take place at a higher speed than the upward movement.

Cam discs were hitherto used to control the several phases of plunger movement. When different kinds of glass articles are to be made, a corresponding number of interchangeable cam discs has to be provided. Pneumatic systems heretofore proposed, do not permit different speeds during upward movement of the piston.

According to the invention, an auxiliary reciprocating motor and a main reciprocating motor are provided and are operated successively to lift the plunger initially at high speed and then at a relatively slow speed. The piston of the auxiliary motor is connected to the plunger to actuate the high speed initial lift of the plunger smoothly and without jerks when pressure fluid is suddenly admitted to the cylinder of the auxiliary motor.

According to a preferred embodiment of the invention, a linkage is formed between the plunger and the auxiliary motor by a toggle joint including two pivotally connected links. The ends of the joint remote from the connecting pivot are articulated to a fixed support and to a push member for the plunger respectively, the auxiliary piston acting on the links or their connecting pivot in such a manner that the plunger is lifted by the collapse of the toggle joint.

Further features and advantages of the invention will be apparent from the following description of a preferred embodiment of the invention illustrated in the accompanying drawings.

Figure 1:
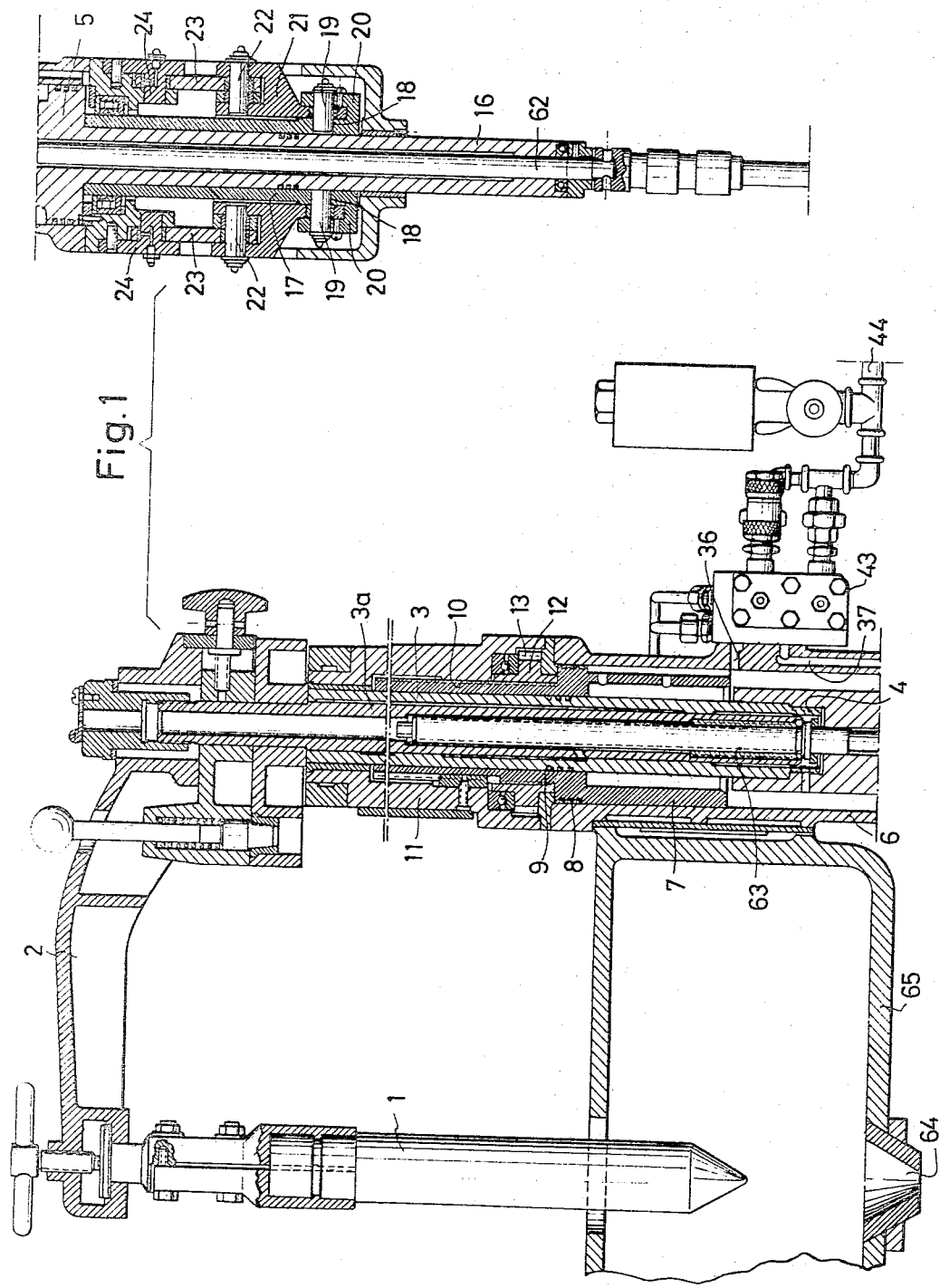
FIG. 1 shows a glass feeder arrangement of the invention in side elevational section along the axis of the main motor.

In the glass feeder illustrated, a plunger 1 is moved toward and away from an outlet aperture 64 of a container 65 for molten glass by an arm 2 fixedly attached to a vertical piston rod 3 which is disposed parallel to the plunger 1 and to which a main motor piston 5 is attached by a screw thread 4. The piston 5 is longitudinally slidable in a main motor cylinder 6. A sleeve 7 bearing sealing rings 8 engages the inner wall of the cylinder 6, and rings 9 form a movable air-tight seal between the sleeve 7 and the piston rod 3. The sleeve 7 limits the stroke of the piston 5 and is adjustable by axial movement on a screw thread 10 of an adjusting nut 12. The nut is rotatably mounted in the stationary motor housing 11. It has teeth 13 on its outer periphery which are engaged by a pinion 15 operated by means of a hand wheel 14. Rotating the wheel makes it possible to lower the sleeve 7 from the top position shown in FIG. 1.

The arm 2 is connected to the piston rod 3, by a hollow spindle 3a. The spindle can be moved with respect to the piston rod 3 by a hand wheel 61 on a spindle 62 whose screw thread 63 engages the hollow spindle 3a.

The main piston 5 is integral with a coaxial sleeve 16 on which a bush 17 is axially slidable toward and away from the main piston 5. The bottom end of the bush 17 is formed with two diametrically opposite radial bores 18. A pin 19 is received in each bore and in a U-shaped bracket 20 integral with the bush 17. This pin forms a pivot for a link 21 which is connected by a pivot 22 to one end of another link 23. The other end of the latter is pivotally connected to the housing 11 by means of a stationary pivot pin 24. The two links 21, 23 thus form a toggle joint which is shown in the extended position in FIGS. 1 and 2. When the toggle joint is collapsed, the bush 17 is lifted and moves the main piston 5 upwards under the pressure transmitted by the pivot pin 19.

The toggle joint is collapsed by means of an auxiliary motor whose piston 26 is movable in a horizontal auxiliary cylinder 25. The piston rod 27 of the auxiliary motor is connected by two connecting rods 28 to the pivots 22 of the toggle joint. The top of the auxiliary cylinder 25 is closed by a movable plug 29 which sealingly engages the cylinder 25. A resilient ring 30 on the face of the plug 29 serves as a stop for the auxiliary piston. A screw thread 31 in the plug 29 engages an adjusting screw 35 which may be rotated by means of a hand wheel 32 and bevel gears 33, 34.

Compressed air is supplied to the main motor by way of two bores 36 and 37 near the top and bottom ends respectively of the cylinder 6. The auxiliary cylinder 25 is correspondingly formed with bores 38 and 39, the latter communicating with a duct 40 in the plug 29.

Figure 2:
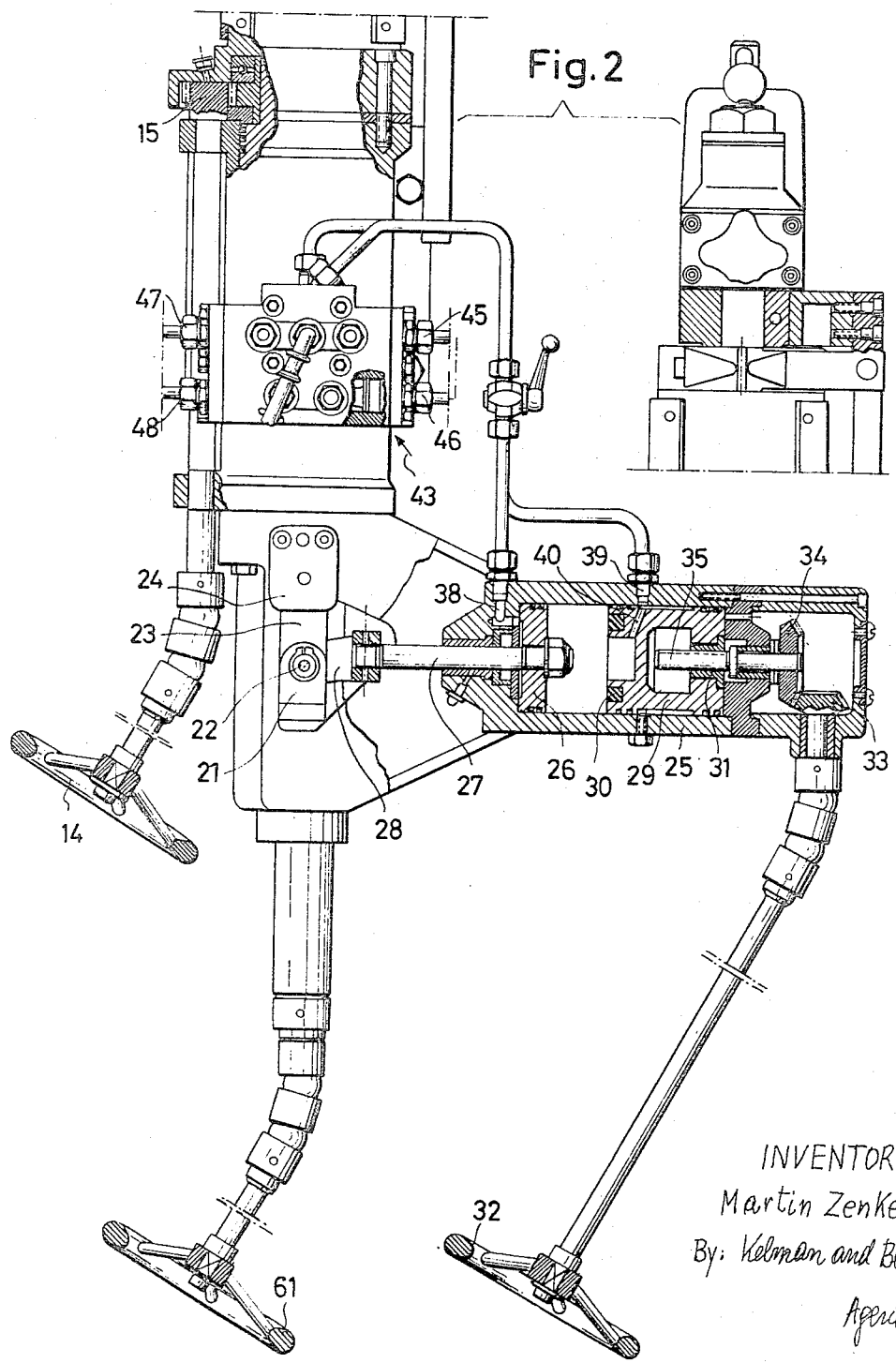
FIG. 2 is a partial front elevational view of the apparatus of FIG. 1, the housing being partly broken open to show internal structure.
Figure 3:
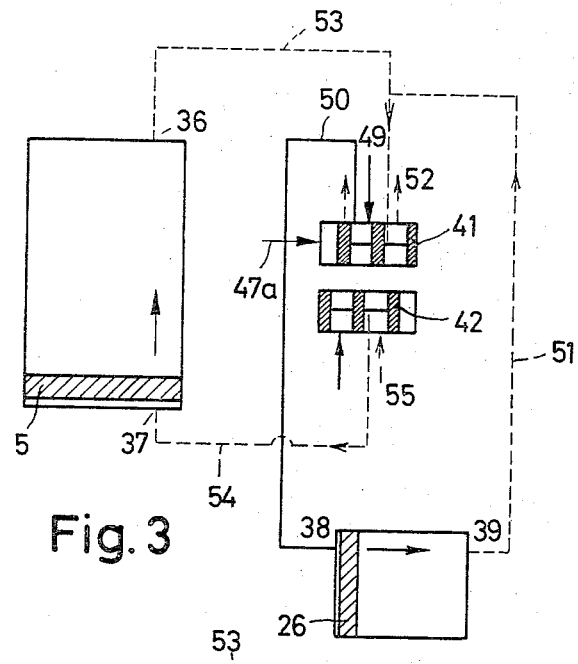
FIGS. 3 to 5 are diagrammatic views of the compressed air system for actuating the device of FIG. 1, the system being shown at various working stages.
Figure 4:
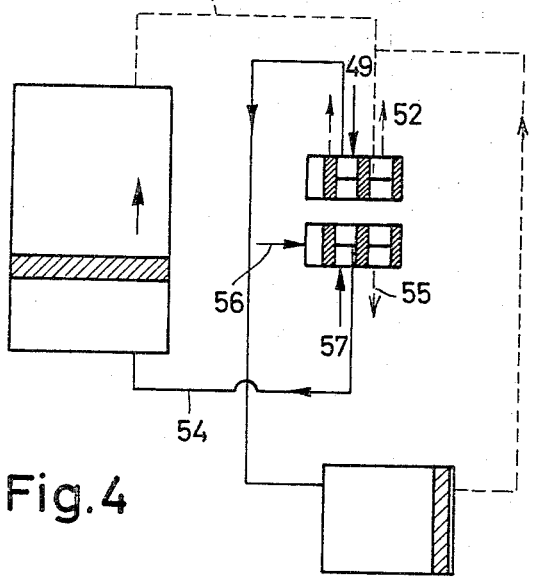
Figure 5:
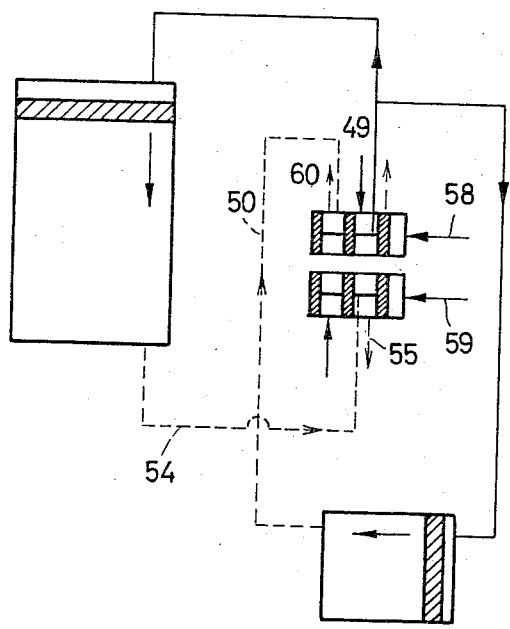

The compressed air control system is shown diagrammatically in FIGS. 3 to 5. It comprises two piston valves 41 and 42 which are accommodated in an attachment 43 shown in FIGS. 1 and 2, and are connected to a compressed air supply pipe 44. This control system first admits compressed air to the bore 38 so that the auxiliary piston 26 is moved from the position shown in FIG. 2 towards the plug 29 until it strikes the latter. This movement of the auxiliary piston 26 causes the toggle joint 21, 23 to collapse. The bush 17 is moved upwards and pushes the main piston 5 before it. This movement of the bush 17 and of the main piston 5 begins gradually and smoothly according to the characteristics of the toggle joint although admission of compressed air to the auxiliary cylinder 25 is sudden. In the last part of its movement, the bush 17 moves so rapidly that the plunger is pushed up at a high speed, and this results in the previously mentioned constriction and drop shape of the lump of glass prior to cut off. After the auxiliary piston 26 has been moved against the plug 29, compressed air is supplied through the bore 37 to the lower end of the main cylinder 6. Conventional pressure reducing means ensure that the main piston 5 moves relatively slowly into abutting engagement with the sleeve 7, the plunger moving correspondingly slowly into its top position. The two pistons 5, 26 are then returned by compressed air to the starting position shown in FIGS. 1 and 2, whereupon the next cycle begins.

The control valves 41, 42 are operated in a conventional manner by compressed air supplied and vented through pipes and connections 45 to 48 shown in FIG. 2. The control valve 41 is first brought from a starting position shown in FIG. 5 into the operative position illustrated in FIG. 3 by means of compressed air supplied through the connection 47, as shown by arrow 47a in FIG. 3. As indicated in solid lines, compressed air then passes from the supply pipe 44 through the inlet 49 into the valve 41 and thence through a pipe 50 to the bore 38 so that the auxiliary piston 26 moves to the right as viewed in FIG. 3 (i.e. it moves away from the main piston 5). The other compartment in the cylinder 25 is vented through the bore 39, a pipe 51, and the control valve 41 to outlet 52. During the movement of the auxiliary piston, the main piston is correspondingly moved, as stated above, by the bush 17. The two bores 36 and 37 are connected by pipes 53, 54 to the outlet 52 and to an outlet 55 of the valve 42.

On completion of the movement of the auxiliary piston, the control valve 42 is moved in the direction of the arrow 56, as shown in FIG. 4, so that compressed air flows from the supply pipe 44 through an inlet 57 of the valve 42 and the pipe 54 to the bottom of the main cylinder 6, whereby the piston 5 is moved up into engagement with the sleeve 7. The top of the cylinder 6 is vented to atmosphere through the pipe 53 and the outlet 52. The two pistons 5 and 26 are held in their terminal positions by the pressure of the air simultaneously admitted to the cylinders 6, 25. The two control valves 41, 42 are then returned to the starting position of FIG. 5 by compressed air admitted through supply pipes and connections 45 and 46 as shown by arrows 58, 59 in FIG. 5. The top of the cylinder 6 and the end of the cylinder 25 are supplied with compressed air, and the opposite ends of the cylinders are connected to corresponding outlets 55, 60 by way of the pipes 54 and 50.

The glass feeder according to the invention operates fully automatically if a timing valve known per se (not described in detail herein) is used for automatic introduction of compressed air into the second valves 41, 42 (as shown by arrows 47a, 56, 58, 59). The plunger, in each cycle, performs first an accelerating and then a relatively slow upward movement followed by a downward movement. Pressure reducing valves make it possible to control the speed of the plunger as required. The total stroke of the plunger and the path of the initial high-speed travel thereof can be varied by means of the hand wheels 14 and 32. In addition, the overall vertical position of the plunger can be varied by means of the hand wheel 61.

I claim:
1. A glass feeder arrangement comprising, in combination:
  (a) a container for holding molten glass and formed with a downwardly open aperture;
  (b) a plunger arranged in said container for movement toward and away from said aperture;
  (c) a stationary support;
  (d) a main motor and auxiliary motor,
    (1) said motors each having a cylinder member, and a piston member arranged in the cylinder member for reciprocating movement;
    (2) one member of at least one motor being secured against movement relative to said support;
  (e) means directly attaching one of said members of said main motor to said plunger for reciprocating movement of said one member of the main motor relative to the other member of said main motor when said plunger moves toward and away from said aperture;
  (f) motion transmitting means interposed between respective members of said motors and connecting said members for actuating movement of said main motor by said auxiliary motor;
  (g) a source of pressure fluid; and
  (h) control valve means interposed between said source and the cylinder members of said motors for actuating said motors in timed sequence.

2. An arrangement as set forth in claim 1, wherein said motion transmitting means include a toggle joint constituted by two links and by three pivots having respective axes normally radially spaced from each other, the first one of said pivots connecting said two links, the second pivot connecting one of said links to one of said motors, the third pivot being mounted on said support and connecting the other link to said support, and the other motor being connected to a portion of said toggle joint intermediate said second and third pivots.

3. An arrangement as set forth in claim 2, wherein said motion transmitting means further include an abutment member movable in the direction of reciprocating movement of the piston member of said one motor toward and away from a position of abutting engagement with said one motor, said abutment member being connected to said one link by said second pivot.

4. A glass feeder arrangement comprising, in combination:
  (a) a container for holding molten glass and formed with a downwardly open aperture;
  (b) a plunger arranged in said container for movement toward and away from said aperture;
  (c) a stationary support;
  (d) a main motor and an auxiliary motor,
    (1) said motors each having a cylinder member secured to said support and a piston member arranged in said cylinder member for reciprocating axial movement,
  (e) means fixedly connecting the piston member of said main motor to said plunger for joint movement therewith;
  (f) motion transmitting means interposed between the piston members of said motors for actuating movement of the piston member of said main motor by said auxiliary motor;
  (g) a source of pressure fluid; and
  (h) control valve means interposed between said source and the cylinder members of said motors for actuating the same in timed sequence.

5. An arrangement as set forth in claim 4, wherein said motion transmitting means include a toggle joint constituted by two links and by three pivots having respective axes normally radially spaced from each other, the first one of said pivots connecting said two links, the second pivot connecting one of said links to the piston member of said main motor, the third pivot being mounted on said support for connecting the other link to said support, and the piston member of said auxiliary motor being connected to a portion of said toggle joint intermediate said second and third pivots.

6. A glass feeder arrangement comprising, in combination:
  (a) a container for holding molten glass and formed with a downwardly open aperture;
  (b) a plunger arranged in said container for movement toward and away from said aperture;
  (c) a stationary support;
  (d) a main motor and an auxiliary motor,
    (1) said motors each having a cylinder member secured to said support and a piston member arranged in said cylinder member for reciprocating movement,
    (2) the piston member of said main motor being fixedly connected to said plunger for joint movement therewith;

(e) motion transmitting means interposed between the piston member of said auxiliary motor and said plunger, said motion transmitting means including a toggle joint constituted by two links and by three pivots having respective axes normally radially spaced from each other, the first one of said pivots connecting said two links, the second pivot connecting one of said links to said plunger, the third pivot being mounted on said support for connecting the other link to said support, and the piston member of said auxiliary motor being connected to a portion of said toggle joint intermediate said second and third pivots;

(f) a source of pressure fluid; and (g) control valve means interposed between said source and the cylinder members of said motors for actuating the same in timed sequence.

7. An arrangement as set forth in claim 6, wherein said motion transmitting means further include an abutment member connected to said one link by said second pivot, and movable on said support toward and away from a position in which said abutment member transmits pressure exerted thereon by said second pivot to said plunger.

References Cited by the Examiner
UNITED STATES PATENTS

| | | | |
|---|---|---|---|
| 1,542,341 | 6/1925 | Deckert | 74—520 |
| 2,246,461 | 6/1941 | Cannon | 65—330 |
| 2,584,815 | 2/1952 | Salfisberg | 156—583 |
| 2,685,765 | 8/1954 | Dahlman et al. | 65—330 |
| 2,950,571 | 8/1960 | Wythe | 65—330 X |

DONALL H. SYLVESTER, *Primary Examiner.*

J. H. NEWSOME, *Assistant Examiner.*